(12) United States Patent
Ganesan et al.

(10) Patent No.: US 12,184,455 B2
(45) Date of Patent: Dec. 31, 2024

(54) EQUALIZER ADAPTATION FOR DATA LINK

(71) Applicant: TEXAS INSTRUMENTS INCORPORATED, Dallas, TX (US)

(72) Inventors: Aravind Ganesan, Bangalore (IN); Ajai Paulose, Bangalore (IN); Ankush G. P., Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 132 days.

(21) Appl. No.: 18/049,865

(22) Filed: Oct. 26, 2022

(65) Prior Publication Data
US 2024/0146584 A1 May 2, 2024

(51) Int. Cl.
*H04L 25/03* (2006.01)
(52) U.S. Cl.
CPC .............................. *H04L 25/03076* (2013.01)
(58) Field of Classification Search
CPC ............................................... H04L 25/03076
USPC .......................................................... 375/232
See application file for complete search history.

(56) References Cited

U.S. PATENT DOCUMENTS

| | | | |
|---|---|---|---|
| 11,177,986 B1 | 11/2021 | Ganesan et al. | |
| 11,196,592 B1* | 12/2021 | Cai | H04L 25/03057 |
| 2012/0300829 A1* | 11/2012 | Wang | H04L 25/03012 |
| | | | 375/232 |
| 2013/0183034 A1* | 7/2013 | Zhang | H04B 10/616 |
| | | | 398/46 |
| 2014/0254655 A1* | 9/2014 | Zhong | H04L 25/03019 |
| | | | 375/232 |
| 2015/0349983 A1* | 12/2015 | Guzik | H04L 25/066 |
| | | | 375/232 |
| 2019/0068397 A1* | 2/2019 | Chen | H04L 12/40 |
| 2022/0286334 A1* | 9/2022 | Cornelius | H04L 25/0272 |

* cited by examiner

*Primary Examiner* — Lihong Yu
(74) *Attorney, Agent, or Firm* — Valerie M. Davis; Frank D. Cimino (57) ABSTRACT

A method for adapting a continuous time equalizer (CTE) includes determining a gain of a discrete time equalizer (DTE) and determining whether the gain has increased or decreased by more than the threshold amount. Responsive to determining that the gain has increased or decreased by more than the threshold amount, the method includes sequentially configuring the CTE for multiple CTE settings such that gain of the CTE is caused to increase or decrease in a same direction with the change in gain of the DTE. The method also includes determining a separate figure of merit (FOM) for each of the multiple CTE settings and selecting a new CTE setting from the multiple CTE settings based on the FOM for each of the multiple CTE settings.

20 Claims, 9 Drawing Sheets

EQUALIZER ADAPTATION FOR DATA LINK

CROSS REFERENCE TO RELATED APPLICATION

This application may contain subject matter related to U.S. Pat. No. 11,177,986, incorporated herein by reference.

BACKGROUND

High data rate network and telecommunication systems are commonplace, with data rates having increased, for modern "5G" telecommunication and Ethernet networks, well into the tens and hundreds of Giga Hertz (GHz), respectively. These high data rates are now commonly supported in and between network nodes and within the network infrastructure itself by high-speed serial communication links operating at frequencies well into the radio frequency (RF) domain. Such high-speed RF serial communication benefits from the use of signal conditioning to compensate for non-ideal effects such as frequency-dependent attenuation, inter-symbol interference (ISI), jitter, and channel distortion, especially to achieve the desired signal-to-noise ratios for more complex modulation schemes. Without such signal conditioning, high-speed serial links over coaxial or other cabling, or even printed circuit board traces, can behave as lossy channels at such high frequencies.

To address these issues, one or more retimers may be implemented along the high-speed serial link, such as in and between network endpoints in high-speed Ethernet and wireless telecommunications networks and infrastructure. Retimers also may be used in other applications such as artificial intelligence (AI) processors, network processors, and the like.

SUMMARY

In one embodiment, a receiver includes an adaptable continuous time equalizer (CTE) having a CTE signal input, a CTE control input, and a CTE output. The CTE cis configured to filter an input signal at the analog input according to an adaptable filter characteristic. The adaptable filter characteristic is based on a CTE setting received at the CTE control input. The receiver also includes an adaptable discrete time equalizer (DTE) having a DTE signal input and a DTE control input. The DTE signal input is coupled to the CTE output. Logic circuitry is coupled to the CTE control input and to the DTE. The logic circuitry is configured to determine a frequency response of the DTE and determine that the frequency response has changed by more than a threshold amount. The logic circuitry is configured to sequentially configure the CTE for multiple new CTE settings based on the change in the frequency response of the DTE. The logic circuitry is further configured to determine a separate figure of merit (FOM) for each of the multiple CTE settings, select a new CTE setting from the multiple CTE settings based on the FOM for each of the multiple CTE settings, and provide the new CTE setting to the CTE control input.

In yet another embodiment, a method for adapting a continuous time equalizer (CTE) includes determining a gain of a discrete time filter and determining whether the gain has increased or decreased by more than the threshold amount. Responsive to determining that the gain has increased or decreased by more than the threshold amount, the method includes sequentially configuring the CTE for multiple new CTE settings such that gain of the CTE is caused to increase or decrease in a same direction with the change in gain of the DTE. The method also includes determining a separate figure of merit (FOM) for each of the multiple CTE settings and selecting a new CTE setting from the multiple CTE settings based on the FOM for each of the multiple CTE settings.

DETAILED DESCRIPTION

The same reference numbers or other reference designators are used in the drawings to designate the same or similar (either by function and/or structure) features.

A retimer includes a receiver, a transmitter and other analog and/or digital circuitry. The embodiments described herein pertain to the adaption of equalizers within the receiver of a retimer. The embodiments also apply to a receiver within an endpoint device. Such retimers may be used in high-speed serial communication technologies, for example in high speed (200G/400G) Ethernet and 5G wireless communications. However, the described embodiments may be beneficially applied in other applications for adaptive equalizers, for example in the receive path of a network node or infrastructure node in other communications applications and using any one of a number of signal modulation schemes, in data transfer paths within individual apparatuses, in other hardware systems such as artificial intelligence (AI) processors, network processors, and the like. The following description is provided by way of example only and is not intended to limit the scope of this disclosure or the claims, unless otherwise stated.

Figure 1:
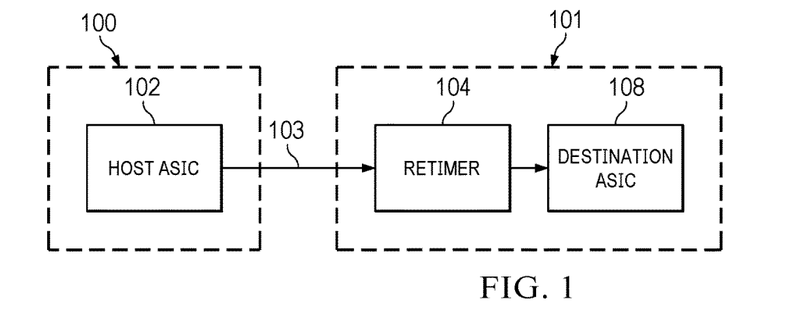
FIG. 1 is an electrical diagram of a communications link including a retimer in accordance with an embodiment.

FIG. 1 illustrates an example of a communications link in which the described embodiments may be implemented. In this example, source endpoint 100 is the source of serial data communications to destination endpoint 101 over a high-speed serial communications link, such as a SERDES link, established between endpoints 100, 101 over wired communication channel 103. Communication channel 103 may be implemented as any suitable type of electrical communications facility. For the example of a "5G" wireless cellular system, source endpoint 100 may correspond to a wireless base station or access point, and destination endpoint 101 may correspond to a switch fabric or other core network function, such as implemented in a line card at a backhaul element or other such network node. In this example, source endpoint 100 includes additional functional circuitry such as a host application-specific integrated circuit (ASIC) 102 for processing the received data (e.g., from a mobile station communicating to source endpoint 100 over a radio link) and controlling the operation of source endpoint 100, and destination endpoint 101 similarly includes destination ASIC 108 for processing data received over link 103. Each of endpoints 100, 101 may be realized by one or more physical system or network node of different types and function supporting the communications link.

In some applications, such as shown in FIG. 1, wired communication channel 103 may behave as a lossy channel for the high-speed serial communications between source endpoint 100 and destination endpoint 101. In this architecture, retimer 104 is provided at destination endpoint 101 to perform signal recovery and signal conditioning, including equalization to compensate for channel conditions of channel 103 and to reset the jitter "budget." In this example, retimer 104 receives high-speed wired serial communication signals transmitted by endpoint 100 over channel 103. Retimer 104 recovers and conditions the signal received from channel 103 for forwarding to processing circuitry at destination endpoint 101, for example destination ASIC 108 as shown in FIG. 1. The particular processing circuitry will, of course, depend on the function and architecture of destination endpoint 101. In one embodiment, retimer 104 is implemented as an integrated circuit (IC) separate from ASIC 108 and may be mounted on the same circuit board as ASIC 108. In another embodiment, retimer 104 may be integrated on the same semiconductor die as ASIC 108.

While FIG. 1 represents a simplified architecture for purposes of describing the context of the described embodiments, the overall architecture of the serial communications link may include multiple retimers 104 along the communications link. The number and arrangement of retimers along the link may vary according to such factors as the network topology and the physical characteristics of the channels between the network nodes. For example, source endpoint 100 may include its own retimer 104 downstream from host ASIC 102 to perform signal conditioning to compensate for losses within source endpoint 100 prior to transmission over channel 103. Furthermore, the communications link may include multiple endpoints, each including one or more retimers 104 for recovering and conditioning the signal along the link. Further, communications in the opposite direction (e.g., endpoint 101 to endpoint 100 in FIG. 1) may include one or more retimers 104 to condition and retransmit the signal from endpoint 101 destined for endpoint 100. In some embodiments, establishment of a communications link involves clock recovery and lane adaptation of retimer 104 along the signal path, and may be carried out serially, for example in order from source to destination.

As is described herein, retimer 104 includes multiple adaptable equalizers. The frequency response of the equalizers may be automatically adjusted in response to, for example, changes in the communication channel 103. Such channel changes that may result in adaption of the frequency response of the retimer's equalizers may include temperature changes as well as dynamic crosstalk resulting from varying traffic patterns on adjacent lanes, aging, etc. The embodiments described pertain to a process for adapting a continuous time equalizer (CTE) based on adaptions to a discrete time equalizer (DTE) within the retimer.

Figure 2:
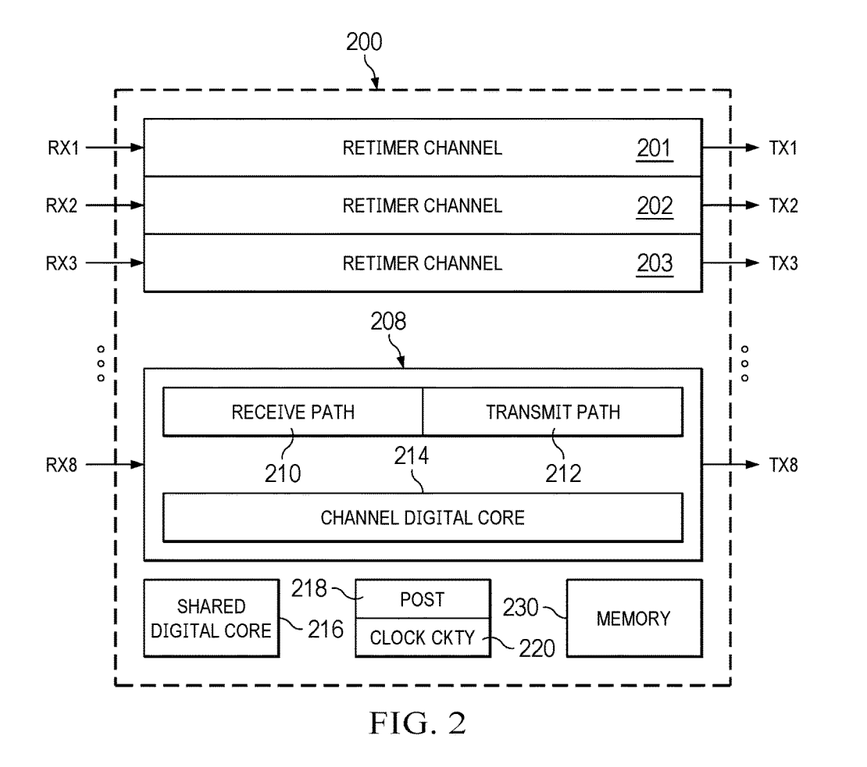
FIG. 2 is an electrical diagram of the retimer of FIG. 1 in accordance with an embodiment.

FIG. 2 illustrates the construction of a retimer 200 according to an example of certain of the described embodiments. Retimer 200 of FIG. 2 may correspond to retimer 104 in the communications link of FIG. 1. In this example, retimer 200 receives serial communications over N multiple channels (such as RX1 through RX8 in FIG. 2; where N equals 8), and in turn transmits serial communications over a corresponding N number of channels (such as TX1 through TX8 in FIG. 2). For the case of N equals eight channels shown in FIG. 2, retimer 200 includes eight retimer channels 201, 202, 203, . . . , and 208. While this example illustrates eight channels, more or fewer channels may be utilized.

Retimer channels 201-208 may be implemented in the same or similar manner as one another. FIG. 2 illustrates an example implementation of retimer channel 208, and such implementation may be indicative of the other channels 201-207. Retimer channel 208 includes a receive path 210 for receiving incoming signals on channel RX8 and a transmit path 212 for transmitting outgoing signals on channel TX8. An example implementation of the receive path 210 is described in further detail below.

Transmit path 212 may include digital and/or analog circuitry (such as filters), driver circuitry, and the like. Retimer channel 208 also includes channel digital core logic 214, which represents digital logic circuitry for processing signals received from or to be transmitted to the channel RX8/TX8 associated with retimer channel 208. Retimer 200 also may include shared digital core 216, which represents digital logic for managing the overall operation of retimer 200. The shared digital core 208 may be or may include a microcontroller and/or processor that executes software. Other circuitry useful in the control and operation of retimer 200, such circuitry including power-on self-test 218, clock generator circuitry 220, and the like, may also be included as shown in FIG. 2. Retimer 200 according to this example also includes memory 230, which may include non-volatile memory for storing software or program code for execution by programmable logic such as channel digital core logic 214 in each channel 201 through 208, shared digital core 216, and by those portions of receive path 210 and transmit path 212 that are realized by programmable logic. Memory 230 also may include volatile or non-volatile memory for storing data. Memory 230 may be realized as a single memory as suggested by FIG. 2 or as distributed throughout retimer 200 and may be implemented according to any one or more of the available memory technologies and organizations.

Figure 3:
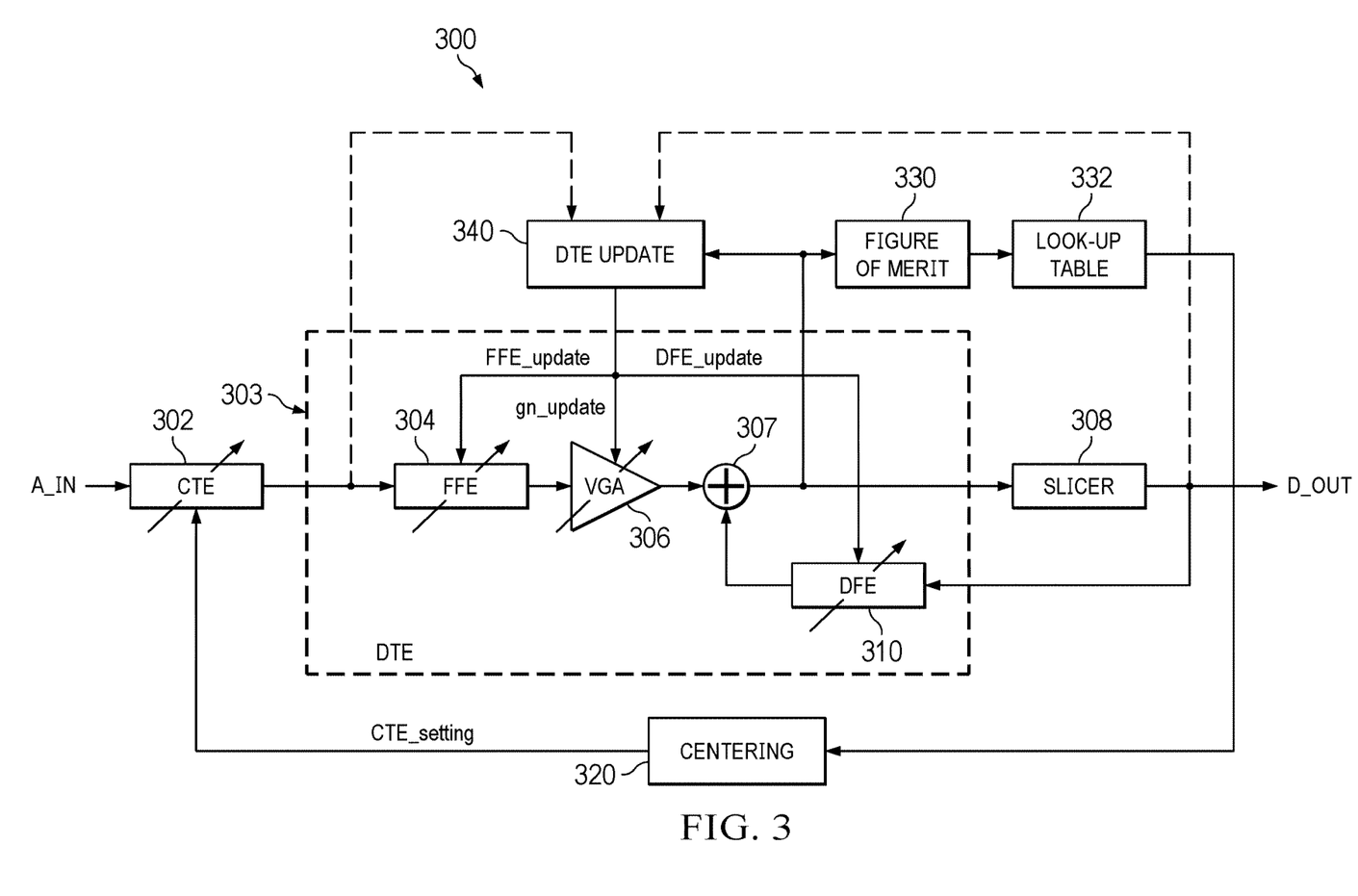
FIG. 3 is an electrical diagram of the receive path of the retimer of FIG. 2 in accordance with an embodiment.

FIG. 3 illustrates the functional architecture of receive path 300 according to an example embodiment. This example embodiment of receive path 300 shown in FIG. 3 and described below may be indicative of receive path 210 in retimer channels 201 through 208 of retimer 200, in cooperation with the other components of retimer 200 in that architecture. The receive path 300 illustrated in FIG. 3 also may be implemented in an endpoint device (e.g., endpoints 100 and 101 in FIG. 1). Receive path 300 may be realized as a combination of analog and/or digital circuitry to realize the analog and digital functions. To the extent that receive path 300 is realized by digital circuitry, such digital circuitry may be implemented as custom or semi-custom logic, application specific logic circuitry or programmable logic, such as a digital signal processor, a general-purpose programmable logic (e.g., a microcontroller), or a combination of these approaches. As noted above, memory 230 is provided in retimer 200, and possibly in receive path 210 itself, to serve as program and/or data memory for these programmable logic functions.

As shown in FIG. 3, receive path 300 receives analog input A_IN at an input of a continuous time equalizer (CTE) 302. Analog input A_IN corresponds to signal RX8 received by retimer 200 from a communications facility, after amplification and initial capacitive coupling by receiver circuitry (not shown) in retimer 200. CTE 302 in this embodiment is an adaptive analog filter that implements a filter characteristic selected from a set of multiple available filter characteristics in response to a digital value CTE_setting from centering logic 320. The arrow through CTE 302 indicates that CTE 302 is an adaptive equalizer. In some examples, CTE 302 is a linear equalizer (e.g., a continuous time linear equalizer (CTLE)). In other examples, however, the equalizer characteristic of CTE 302 is not linear.

Receive path 300 also includes a discrete time equalizer (DTE) 303. DTE 303 may be implemented as a linear equalizer (e.g., a discrete time linear equalizer (DTLE)). However, DTE 303 may be a non-linear equalizer. In this example, DTE 303 includes a feed-forward equalizer (FFE) 304, a variable gain amplifier (VGA) 306, summing logic 307, and a decision feedback equalizer (DFE) 310. The arrows through FFE 304 and DFE 310 indicate that each is an adaptive equalizer. DTE 303 may be implemented using digital circuitry. For example, an analog-to-digital converter (ADC) may be used to digitize the signals from CTE 302, followed by digital filters implementing FFE 304 and DFE 310 implemented, for example, by a digital signal processor (DSP) or other processing logic circuitry. Alternatively, DTE 303 may be implemented as analog circuitry. For example, FFE 304 and DFE 310 may include sample-and-hold stages, amplifiers (to apply the tap weights), and analog summers (to produce the filter output). In any case, the filtered signal that is output by CTE 302 is coupled (e.g., via a clock and data recovery function, not shown) to an input of FFE 304, which in turn applies a discrete time filter with tap weights selected according to a digital value FFE_update.

The filtered output of FFE 304 is applied to an input of VGA 306, which amplifies that signal by a gain selected responsive to gain value gn_update and applies the amplified signal to a first input of summing circuit 307, which receives a feedback signal at a second input. Summing circuit 307 may be realized by adder circuitry, arithmetic logic operating according to program instructions, or the like. The output of summing circuit 307 is applied to slicer 308, which quantizes the output of summing circuit 307 to a digital symbol value and presents that symbol as digital output D_OUT. In this embodiment, DFE 310 receives the digital output D_OUT from slicer 308, applies a discrete time filter with tap weights selected responsive to a digital value DFE update, and presents the filtered output at the second input of summing circuit 307. Summing circuit 307 thus provides a summed signal comprising the output of VGA 306 plus a feedback signal from DFE 310 and presents the summed signal to slicer 308 for demodulation and quantization to a digital symbol value presented at digital output D_OUT.

In some embodiments, the CTE 302 is adapted based on the adaption of the DTE 303, such that the adaptation of the DTE 303 informs the adaptation of the CTE 302. In receive path 300 in the example embodiment of FIG. 3, and as described below, DTE update logic 340 adapts the FFE 304 and DFE 310, as well as the VGA 306. Centering logic 320, figure of merit (FOM) calculation logic 330, and look-up table (LUT) 332 adapt the CTE 302. In one embodiment, centering logic 320 and the LUT 332 are implemented by the shared digital core 216 (which itself may comprise a microcontroller, processor and/or other circuitry executing software stored in memory 230), and the DTE update logic 340 and the FOM calculation logic 330 are implemented in the channel digital core 214 of the respective retimer channel. In another embodiment, all of the centering logic 320, the FOM calculation logic 330, the LUT 332, and the DTE update logic 340 are implemented by the shared digital core (e.g., microcontroller, processor and/or other circuitry executing software). In yet another embodiment, all of the centering logic 320, the FOM calculation logic 330, the LUT 332, and the DTE update logic 340 are implemented in the channel digital core 214 (including, for example, a microcontroller, processor, other circuitry and/or software). In another embodiment, one or more of the centering logic 320, the FOM calculation logic 330, the LUT 332, and the DTE update logic 340 are implemented by the shared digital core 216 (including, for example, a microcontroller, processor, other circuitry and/or software), and the rest of the centering logic 320, the FOM calculation logic 330, the LUT 332, and the DTE update logic 340 are implemented in the channel digital core 214 (including, for example, a microcontroller, processor, other circuitry and/or software). The set of components (and possibly other components) that implement the functionality of the centering logic 320, the FOM calculation logic 330, the LUT 332, and the DTE update logic 340 is referred to herein as "logic circuitry."

In the example embodiment of FIG. 3, the output of summing logic 307 is also received at FOM logic 330 for determination (e.g., with LUT 332) of a measure of signal quality based on one or more attributes of the signal levels output by summing logic 307. The output of FOM logic 330 is applied, via LUT 332, in this example, to centering logic 320, which generates a CTE_setting that is applied to CTE 302 to set its filter characteristic. The filter characteristic refers to, for example, the frequency response of the CTE 302.

In the example of FIG. 3, DTE update logic 340 updates control values FFE_update, gn_update, and DFE_update for application to FFE 304, VGA 306, and DFE 310, respectively, in the adaptation of DTE 303. According to embodiments described in further detail below, DTE update logic 340 adapts DTE 303 in response to, for example, a measurement of error in the equalizing performed by DTE 303 at its current tap weights or other settings. In one particular example, DTE 303 performs such DTE adaptation in some embodiments based on a gradient of that error. As such, DTE update logic 340 receives one or more inputs from along the signal path on either side of DTE 303, for example from one or more of the output of summing logic 307 as input to slicer 308, the output of slicer 308, and/or the output of CTE 302 as input to FFE 304.

Some retimers may adapt the CTE 302 by periodically performing a CTE adaption process that involves "sweeping" CTE settings from a lower CTE_setting to a higher CTE_setting, computing a FOM value for the retimer at each CTE_setting along the sweep, and selecting one of the CTE_settings based on the FOM values. In performing the CTE_setting sweep, however, some of the CTE_settings may implement a particular frequency response for the CTE 302 that, while those particular CTE_settings are implemented, results in an increased bit error rate (BER). Accordingly, performing a brute force sweep of CTE_settings results in the selection of an appropriate CTE_setting, but temporarily increases the BER of the retimer.

The retimer described herein performs a CTE adaption process that mitigates the BER problem noted above. The described CTE adaption process has two features to mitigate the BER problem. First, the described CTE adaption process is not triggered periodically. Instead, the CTE adaption process is triggered based on an assessment of the DTE adaption. For example, if the gain of the DTE's equalizers (e.g., the FFE 304 and/or DFE 310) changes (either increasing or decreasing) by more than a threshold amount, the CTE adaption process is triggered. Otherwise, the CTE adaption process is not performed. Accordingly, in at least some embodiments while the DTE adaption process may be performed periodically, the CTE adaption process is only triggered if the DTE adaption process results in a large enough change in the gain settings for the DTE equalizers.

Second, when a CTE adaption process is triggered, the sweep of the CTE settings is in the direction (increasing or decreasing) that will result in the same CTE gain change as the gain change for the DTE equalizers. For example, if a DTE adaptation process results in an increase in the gain of the DTE equalizers, then a triggered CTE adaptation process involves sweeping a set of CTE settings that all result in an increase in the gain of the CTE 302. Similarly, if a DTE adaptation process results in a decrease in the gain of the DTE equalizers, then a triggered CTE adaptation process involves sweeping a set of CTE settings that result in a decrease in the gain of the CTE 302. By potentially triggering less frequent CTE adaptation processes and trying new CTE settings that only change the CTE gain in the same direction as the gain change of the DTE equalizers, the retimer 300 adapts the CTE 302 while resulting in a lower BER than other CTE adaption processes.

In one embodiment (included in the logic flow of FIG. 4, described below), the logic circuitry triggers a search for a new CTE setting in response to determining that the gain of the FFE 304 has changed by more than a threshold amount. In another embodiment, the logic circuitry triggers a search for a new CTE setting in response to determining that the gain of the DFE 310 has changed by more than a threshold amount. In yet another embodiment, the logic circuitry triggers a search for a new CTE setting in response to determining that the gains of the FFE 304 and the DFE 310 have each changed by more than a threshold amount.

Figure 4:
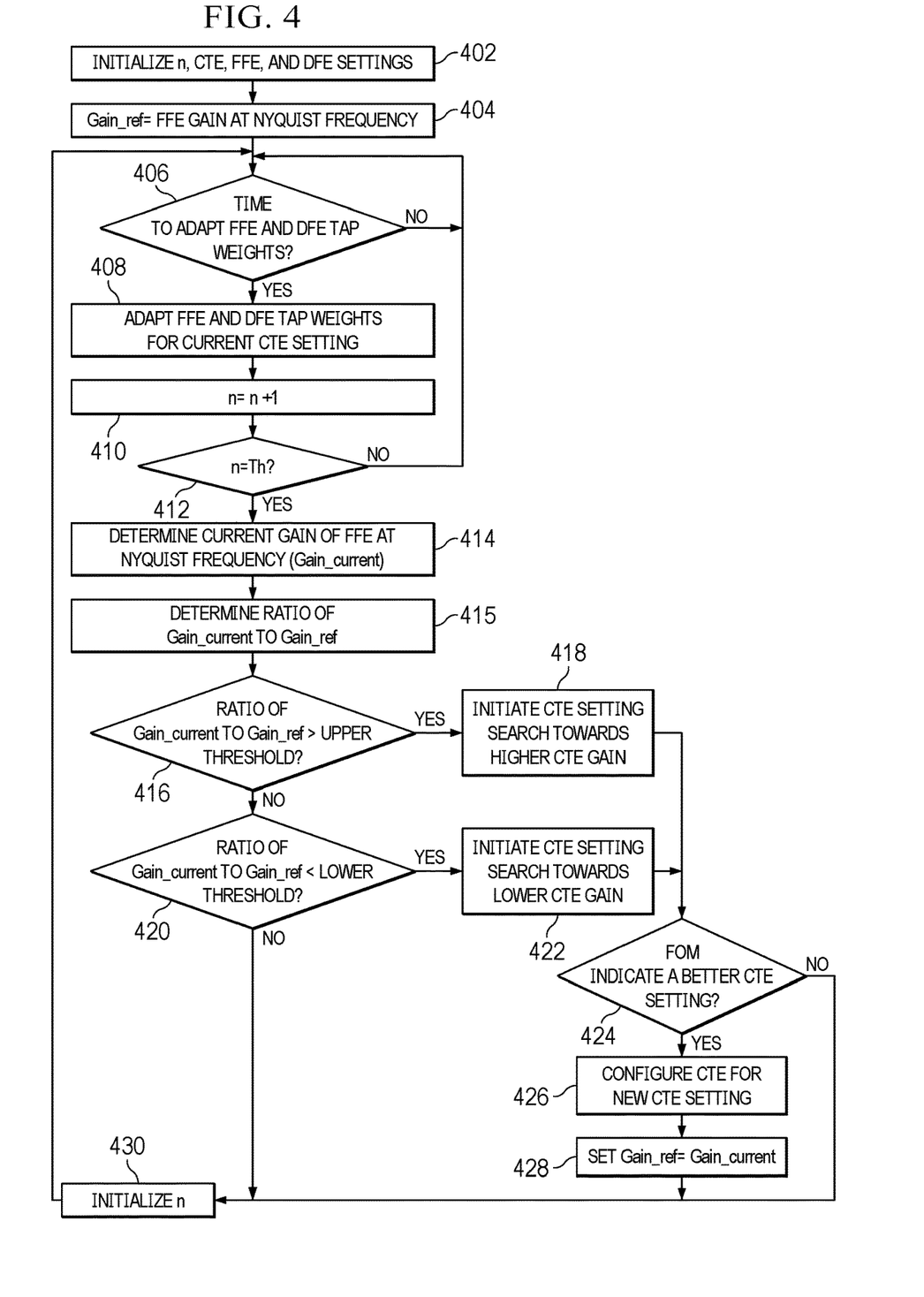
FIG. 4 is a flowchart illustrating a method for adapting the continuous time equalizer (CTE) of the receive path in accordance with an embodiment.

FIG. 4 is a flowchart showing an example of the process for adapting the CTE 302. The logic circuitry described above implements one or more or all of the steps shown in the example of FIG. 4. At step 402, the logic circuitry initializes an index value n, as well as settings for the CTE 302, FFE 304, and DFE 402. The logic circuitry may perform step 402 upon power-up of the retimer. In one example, the index value n may be initialized to a value of 0 or 1. The initial CTE_setting, FFE_update, and DFE_update for the CTE 302, FFE 304, and DFE 310, respectively, as well as gn_update for the VGA 306, may be stored in memory 230 and provided to the respective components (CTE 302, FFE 304, and DFE 310) by the logic circuitry.

At step 404, the logic circuitry initializes a value of Gain_ref to the gain setting for FFE 304 at the Nyquist frequency. In this context, the Nyquist frequency is one-half of the baud rate of the retimer. The value Gain_ref is a variable that is used in the process of FIG. 4.

Figure 10:
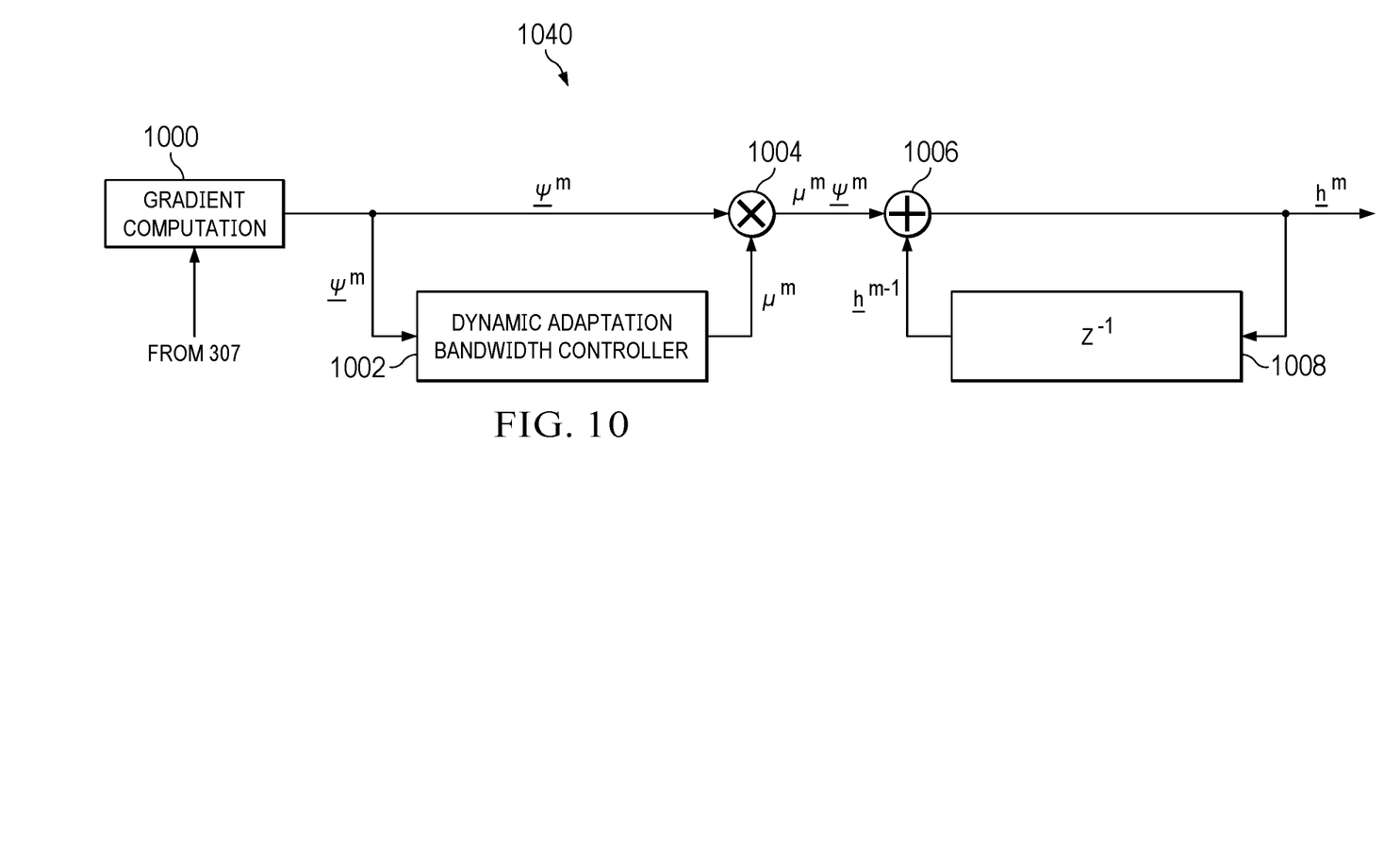
FIG. 10 is an electrical diagram of discrete time equalizer update logic in the receive path of the retimer, according to an embodiment.
Figure 11:
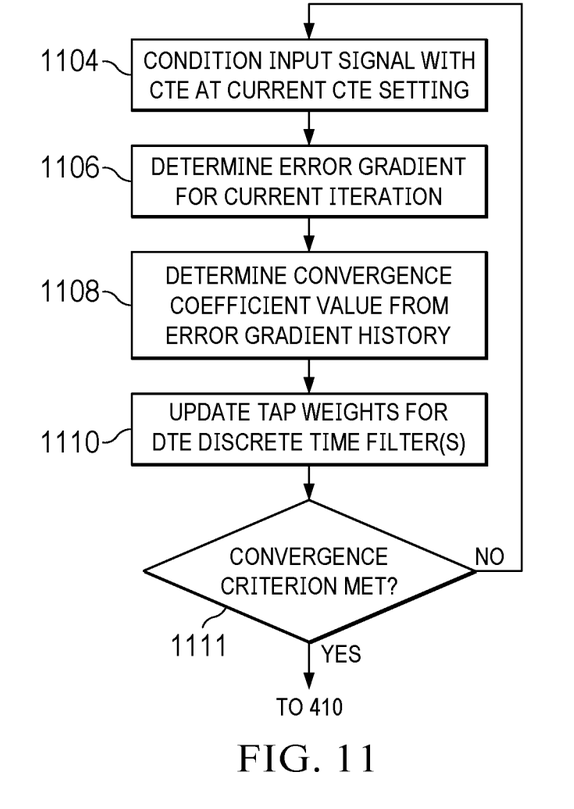
FIG. 11 is a flowchart illustrating a method for the adaption of the retimer's discrete time equalizer, in accordance with an embodiment.
Figure 12:
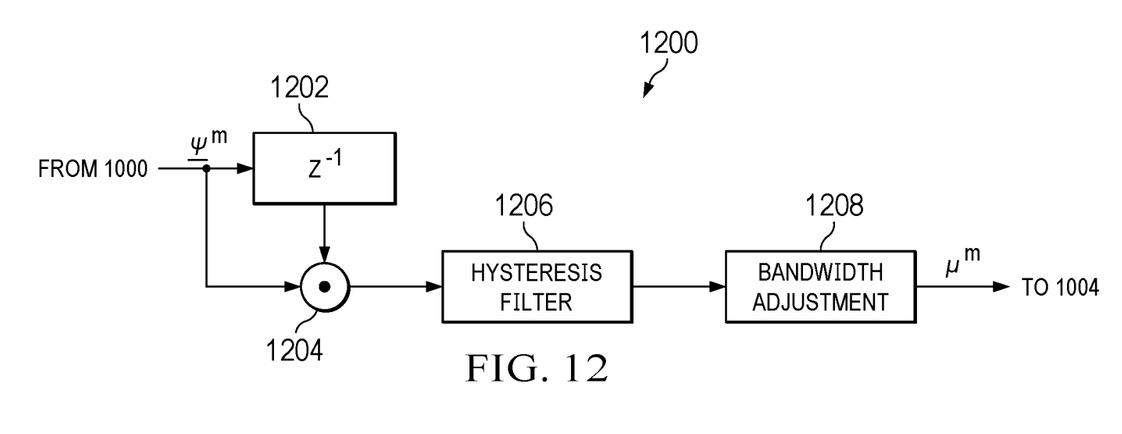
FIG. 12 is an electrical diagram of a dynamic adaption bandwidth controller in the discrete time equalizer update logic of FIG. 10, in accordance with an embodiment.

At decision step 406, the logic circuitry determines whether it is time to adapt the FFE 304 and DFE 310. Adapting those equalizers involves determining a new set of weights for the taps of the equalizers. In one example, the FFE 304 comprises a 5-tap filter, and the DFE 310 also comprises a 5-tap filter. The amount of time permitted to elapse before the FFE and DFE adaption is performed is application-specific (e.g., once every 0.5 seconds, 1 second, 1 minute, etc.). If it is time to perform an FFE and DFE adaptation, then at step 408, the logic circuitry adapts the weights for the taps of the FFE 304 and DFE 310 using the current CTE_setting value. FIGS. 10-12, described below, provide an example of how the weights of the FFE and DFE 310 can be adapted.

At step 410, the logic circuitry increments the index value n. In other embodiments, the index value n may be initialized to a positive value (e.g., 100) at step 402, and then decremented at step 410. At step 412, the logic circuitry determines whether the index value n has reached a threshold value (Th). The number of increments of n until the threshold value Th is reached represents the number of iterations of the DTE adaptation that are performed until a potential CTE adaption is performed. If the index value n is incremented at step 410, then the threshold value Th may be any suitable positive value. For example, if Th is 100, then for every 100 adaptations of the DTE 303, the logic circuitry determines whether to perform a CTE adaptation. Steps 414-428 are an example of the CTE adaption. The threshold value Th can be any suitable number greater than or equal to 1.

At step 414, the logic circuitry determines the current gain setting (Gain_current) for the FFE 304 at the Nyquist frequency. In one example, a value indicative of the Nyquist frequency is an input to the retimer as a configuration parameter. The current gain setting for the FFE 304 may be different than the previously set value of Gain_ref due to an previous adaption of the FFE's gain. An example implementation of this determination includes the computation of the Fourier Transform of the tap weights of the FFE 304. Any suitable type of Fourier transform is possible such as a Discrete Fourier Transform (DFT). In one example, the frequency response at a frequency f for the FFE 304 with coefficients $c_k$ (k is the index number of the coefficients) can be calculated as:

$$\text{Gain\_current}(f) = \Sigma_{k=-2}^{2} c_n e^{-2\pi k f} \quad (1)$$

where Gain_current(f) is the gain of the FFE 304 at a particular frequency f (f is the Nyquist frequency in this example embodiment), and k is index of the coefficients of the filter's taps. In the example of Eq. (1), the coefficients k are −2, −1, 0, 1, and 2, which correspond to the taps of a 5-tap FFE filter. In general, the FFE 304 can be implemented with any suitable number of taps, and the range of k will correspond to the number of taps of the filter.

As described above, the logic circuitry determines whether the gain of the FFE has changed by more than a threshold amount. In the example of FIG. 4, the logic circuitry performs this determination by calculating the ratio of the current FFE at the Nyquist frequency to the previous gain of the FFE at the Nyquist frequency. The current FFE gain at the Nyquist frequency is Gain_current, and the previous gain of the FFE at the Nyquist frequency is Gain_ref. Accordingly, at step 415 the logic circuitry computes the ratio of Gain_current to Gain_ref.

At decision step 416, the logic circuitry determines whether the ratio of Gain_current to Gain_ref is greater than an upper threshold. If Gain_current is greater than Gain_ref, then the ratio of Gain_current to Gain_ref is greater than 1. In one example, the upper threshold is 1.2, which means that if the "Yes" branch from decision step 416 is taken (ratio is larger than the upper threshold), Gain_current is at least 20% larger than Gain_ref. In general, the upper threshold is greater than 1. Examples of the upper threshold include 1.1, 1.2, 1.3, etc. The ratio of Gain_current to Gain_ref being greater than the upper threshold means that gain of the FFE 304 at the Nyquist frequency has increased. That being the case, then to the extent the gain of the CTE 302 is changed, the CTE's gain also should be increased. Accordingly, at step 418, the logic circuitry initiates a search for a new CTE setting trying potential values for the CTE setting that all result in an increase in the gain of the CTE 302. Whether the potential CTE settings being tried are larger values of the CTE setting or smaller values is application specific. That is, in some implementations, increasing the CTE setting causes the gain of the CTE to increase, while in other implementations, decreasing the CTE setting causes the gain of the CTE to decrease.

If, at decision 416, the logic circuitry determines that the ratio of Gain_current to Gain_ref is not larger than the upper threshold, then at decision step 420, the logic circuitry determines whether the ratio of Gain_current to Gain_ref is smaller than a lower threshold. If Gain_current is smaller than Gain_ref, then the ratio of Gain_current to Gain_ref is smaller than 1. In one example, the upper threshold is 0.8, which means that if the "Yes" branch from decision step 420 is taken (ratio is smaller than the lower threshold), Gain_current is at least 20% smaller than Gain_ref. In general, the lower threshold is smaller than 1. Examples of the lower threshold include 0.9, 0.8, 0.7, etc. The ratio of Gain_current to Gain_ref being smaller than the lower threshold means that gain of the FFE 304 at the Nyquist frequency has decreased. That being the case, then to the extent the gain of the CTE 302 is changed, the CTE's gain also should be decreased. Accordingly, at step 422, the logic circuitry initiates a search for a new CTE setting trying potential values for the CTE setting that all result in a decrease in the gain of the CTE 302. Whether the potential CTE settings being tried are smaller values of the CTE setting or larger values is application specific. That is, in some implementations, decreasing the CTE setting causes the gain of the CTE to decrease, while in other implementations, increasing the CTE setting causes the gain of the CTE to decrease.

If the ratio of Gain_current to Gain_ref is between the lower and upper thresholds (that is, the "No" branch from step 420; the gain setting for the FFE 304 has not changed enough that the retimer would benefit from an adaptation of the CTE 302), the logic circuitry does not initiate a setting a search for a new CTE_setting. Instead, the logic circuitry again initializes the index value n at step 430 and the process repeats starting with step 406.

Other techniques for determining when to trigger a search for a new value of the CTE_setting are also possible. In one such example, the logic circuitry determines whether to trigger a search for a new CTE_setting value based on absolute threshold values of the FFE (or DFE or both FFE and DFE) tap coefficient values. In one example, each tap coefficient has its own threshold value, and any tap coefficient exceeding its respective threshold value triggers a new CTE_setting value search. In another example, the logic circuitry determines whether to trigger a search for a new CTE_setting value based on a threshold or incremental change of the FFE (or DFE or both FFE and DFE) tap coefficients. In this latter example, the logic circuitry implements an incremental change threshold for each tap coefficient (possibly unique incremental change thresholds) and determines whether any given tap coefficient exceeds its corresponding incremental change threshold.

When a CTE setting search is initiated, the logic circuitry performs a sweep of potential CTE settings (to either increase or decrease the CTE's gain as explained above). The number or range of the CTE settings tried is application specific. For each potential CTE setting, the logic circuitry determines a FOM for the retimer with the CTE 302 configured for that particular CTE setting.

Figure 5:
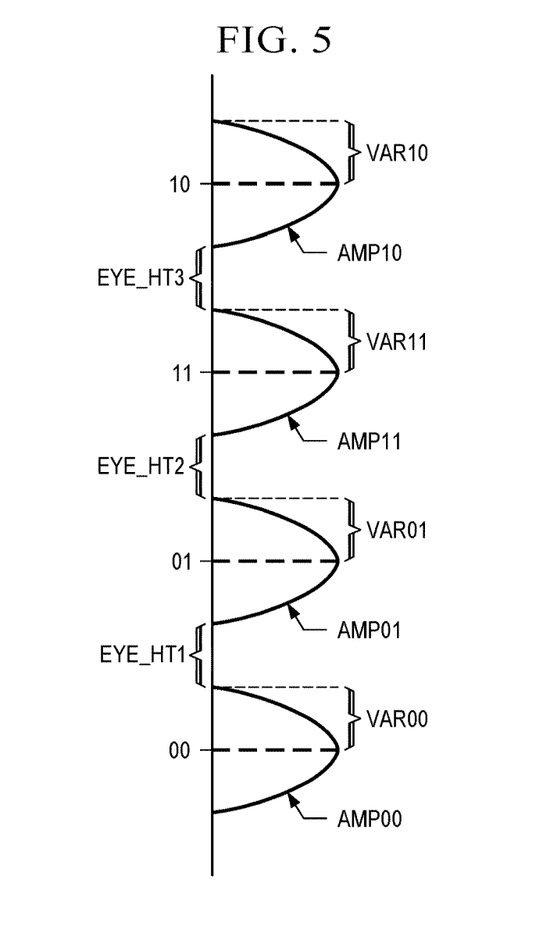
FIG. 5 is a plot of signal levels according to PAM4 modulation, illustrating examples for determining a figure of merit (FOM) according to an embodiment.

The FOM is a measure of the quality of the signal at the input of slicer 308 (e.g., at the output of summing logic 307). The "eye" diagram of superimposed signal transitions between logic 1 and 0 levels is an example of a measure of the quality of data recovery in a receive path, as it reflects data-dependent noise and jitter. According to at least some embodiments, the determination of the FOM during CTE setting search of steps 418 and 422 can be performed in any of multiple ways, two of which are illustrated in FIG. 5. The vertical axis of FIG. 5 depicts the amplitude levels of the four possible data symbol values of pulse amplitude modulation (e.g., PAM4), namely "00", "01", "11", and "10" in order of increasing, Gray-coded amplitude, with plots AMP00, AMP01, AMP11, AMP10, respectively. These plots AMP00, AMP01, AMP11, AMP10 plot the actual sampled amplitudes of received signals as processed by CTE 302 at its current CTE_setting value and DTE 303 (FFE 304, VGA 306, and DFE 310) adapted to convergence for signals filtered by CTE 302 at that setting. One way of determining the FOM is for FOM logic 330 to measure distances EYE_HT1, EYE_HT2, and EYE HT3 shown in FIG. 5 between adjacent plots AMP00, AMP01, AMP11, and AMP10—such distances corresponding to the "eye height" in the corresponding "eye" diagram at this adaptation point. In another embodiment, instead of measuring the distance of the eye opening, the logic circuitry determines the number of signal hits in a region centered around each eye. The number of signal hits is another indication of the quality of equalization—a lower the number of signal hits indicates a better equalized state.

Alternatively, and also as shown in FIG. 5, a measure of variances VAR00, VAR01, VAR11, and VAR10 in plots AMP00, AMP01, AMP11, and AMP10, respectively, relative to the ideal levels 00, 01, 11, 10, respectively, may be determined by FOM logic 330. LUT 332 may be provided to convert the measure or measures generated by FOM logic 330 into a FOM value, normalized as desired for the joint adaptation process of this example embodiment, if FOM logic 330 does not itself directly calculate the FOM value. Other approaches to calculating a FOM value from the signal at the output of summing logic 307 can be implemented.

Figure 6:
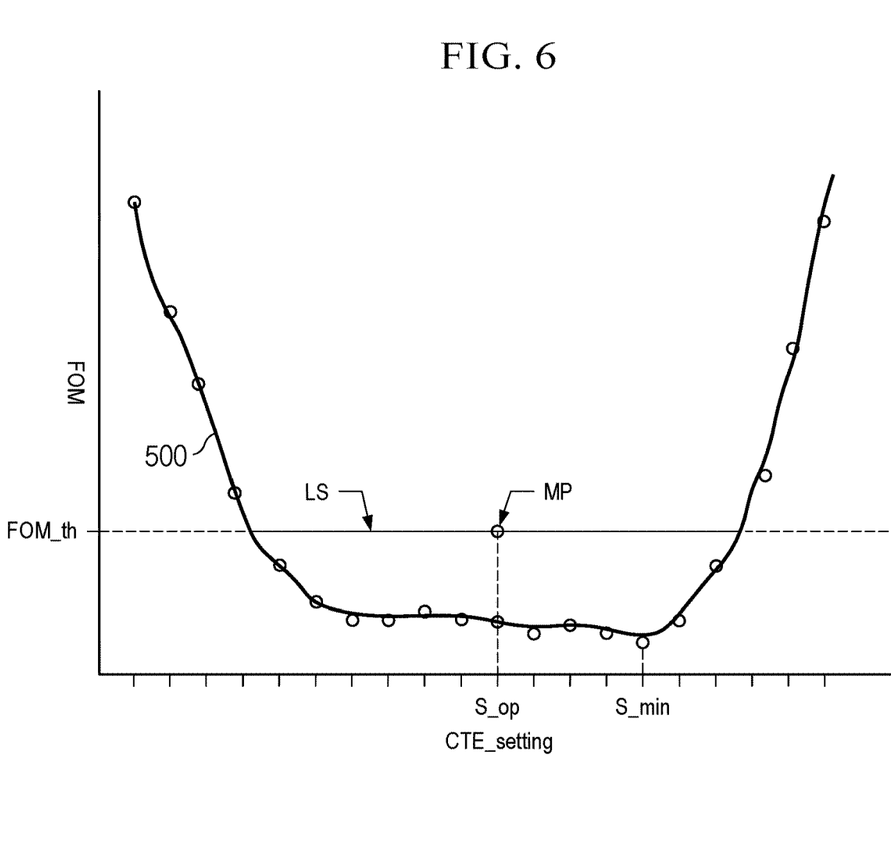
FIGS. 6, 7, and 8 are plots of FOM versus CTE settings illustrating examples for determining an appropriate CTE setting in accordance with an embodiment.
Figure 7:
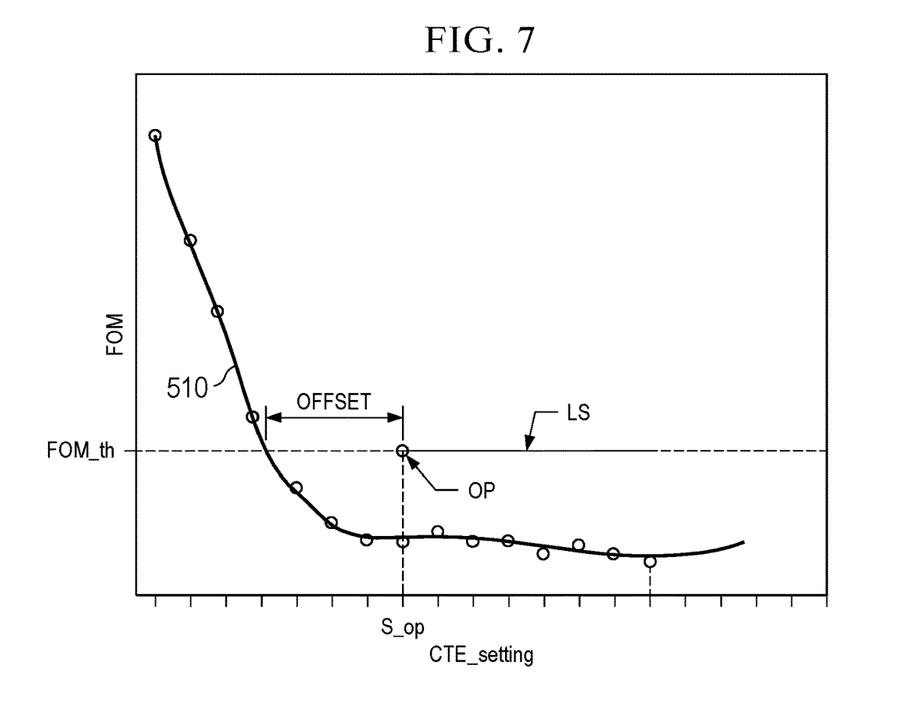
Figure 8:
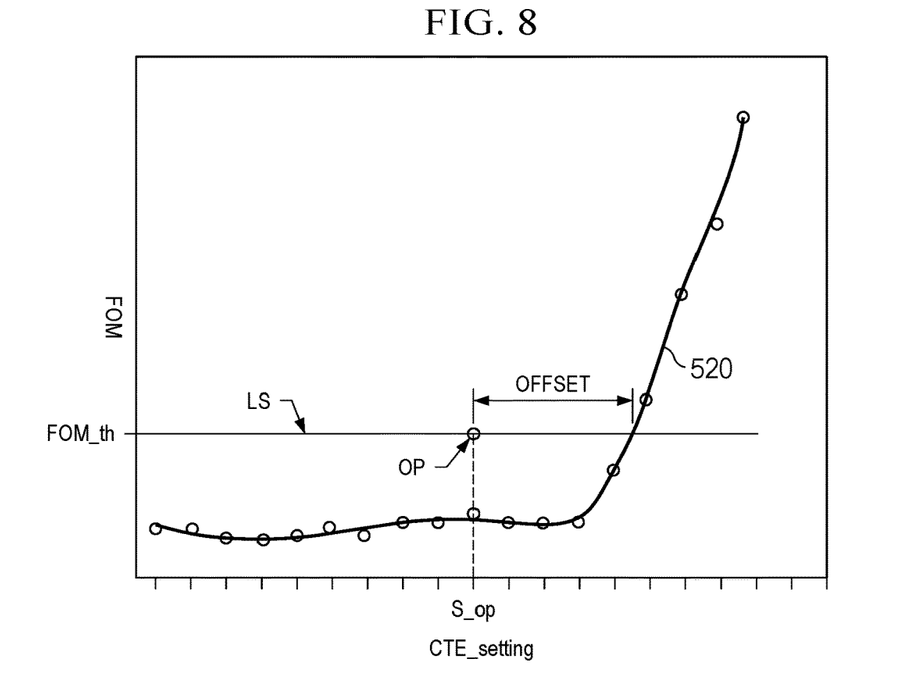

As a result of the CTE setting search of step 418 or 422, the logic circuitry determines multiple FOMs—one FOM for each potential CTE_setting. At decision step 424, the logic circuitry analyzes the FOMs to determine if a better CTE_setting is available than the current CTE setting. FIGS. 6, 7 and 8, described below, illustrate three example techniques for making this determination.

Following the determination of an FOM value for each CTE_setting value to be considered (decision 407 returns "no"), centering logic 320 or other appropriate logic in receive path 300 derives a relationship of FOM value versus CTE_setting. The form in which the relationship of FOM to CTE_setting is derived can vary, depending on the logic (e.g., digital logic) or algorithm used to realize centering logic 320 or other logic in receive path 300. Curve 500 in FIG. 6 illustrates an example of a relationship of FOM value versus CTE_setting in which lower FOM values correspond to better quality of data recovery from the received signal, and the discrete values of CTE_setting correspond to discrete filter characteristics for CTE 302. In this example, individual points along curve 500 represent the FOM value for signals received during CTE adaptation. In the example shown in FIG. 6, the filter characteristics of CTE 302 set by the extreme low and high values of CTE_setting (e.g., at low and high CTE gain) result in high (i.e., poor) FOM values, while the mid-range values of CTE_setting provide much better (i.e., lower) FOM values. A DTE architecture including both an FFE 304 and a DFE 310, as in this example embodiment of FIG. 3, may exhibit a flat region of FOM over mid-range values of CTE_setting as in curve 500 in FIG. 6. The range of CTE_settings shown in FIG. 6 may represent the range of values starting with the previous CTE_setting value and increasing or decreasing to either increase or decrease the CTE's gain in the same direction as the change in the gain setting for the DTE 303.

Centering logic 320 analyzes the relationship of FOM to CTE_setting to identify an acceptable value of CTE_setting to be used for the CTE 302. Centering logic 320 will perform this analysis numerically in an appropriate manner for its logic realization. FIG. 6 illustrates an example of one approach used to perform this analysis, for the case in which the FOM relationship determined in process 410 exhibits a generally flat FOM region. According to this approach, a threshold value FOM_th of acceptable FOM values is identified, either as may be predetermined or as derived from the FOM versus CTE_setting identified during runtime. The logic circuitry (e.g., centering logic 320) determines a line segment LS between two points at which curve 500 crosses threshold value FOM_th. The CTE_setting value S_op that is closest to the midpoint MP of this line segment LS is then selected for application to CTE 302 as the value of CTE_setting (step 426 in FIG. 4). In another example, the logic circuitry (centering logic 320) may select the CTE_setting that corresponds to the numerically best (e.g., smallest in this example) FOM.

Alternative approaches for determining an appropriate CTE_setting based on the relationship between FOM and CTE_setting are also possible, particularly for those channels that do not exhibit a flat center FOM region as was the case for FIG. 6. For example, a high loss channel may exhibit FOM characteristic 510 shown in FIG. 7, in which the FOM is poor at low CTE_setting values (e.g., CTE 302 at a low gain), but does not degrade at higher CTE_setting values (e.g., CTE 302 at high gain). Conversely, a low loss channel may exhibit FOM characteristic 520 shown in FIG. 8, in which the FOM is acceptable with CTE 302 at low gain CTE_setting values, but degrades as the gain of CTE 302 increases at higher CTE_setting values (CTE 302 at high gain). In either of these cases, the FOM characteristic 510, 520 intersects threshold FOM_th at only one point, preventing centering logic 320 from identifying a midpoint MP as otherwise was the case of FIG. 6. According to the embodiments of FIGS. 7 and 8, if centering logic 320 identifies that FOM characteristic is single-sided, such as is the case in FIGS. 7 and 8, in deriving the relationship of FOM value versus CTE_setting, centering logic 320 identifies CTE_setting value S_op as a CTE_setting value that is at or closest to a predetermined offset (in CTE_setting values) from the single intersection of the FOM characteristic 510, 520 with threshold FOM_th. This CTE_setting value S_op, based on an offset from the FOM_th intersection point, is then applied to CTE 302 as the CTE_setting value in step 426 (FIG. 4).

If a new CTE_setting is determined at 424, then the logic circuitry applies that setting to CTE 424 at step 426. At step 428, the logic circuitry sets the value of Gain_ref equal to Gain_current. Control loops continues at step 430 in which the index value n is reinitialized, following which control loops to decision step 406. Otherwise, if the logic circuitry determines that no improvement in the FOM for the retimer can be achieved by adjusting the CTE_setting, then a new CTE_setting is not selected and Gain_ref remains unchanged. For example, in the case in which channel loss is extremely low or high, then the current CTE setting may result in the best configuration (gain) for the CTE, and no better CTE setting is possible.

Figure 9:
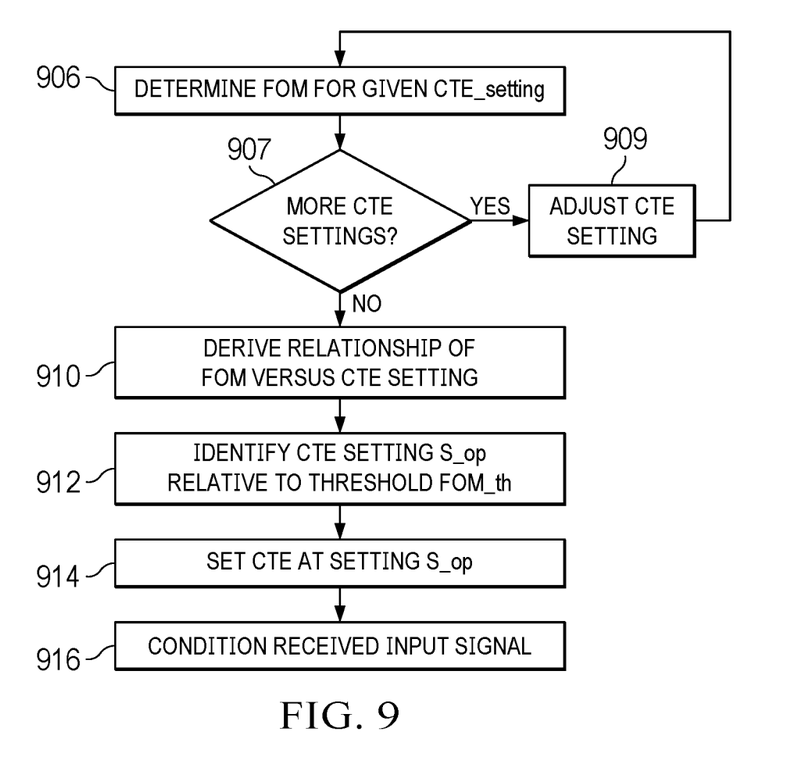
FIG. 9 is a flow chart illustrating a process for determining the CTE setting in accordance with an embodiment.

FIG. 9 is a flow chart illustrating an example for selecting a particular CTE_setting based on FOM values. At step 906, the logic circuitry determines a FOM for a given CTE_setting. If more CTE settings are to be tried (as determined at step 907), then at step 909, the logic circuitry adjusts the CTE setting (to either increase or decrease the CTE's gain as described above), and step 906 is again performed, this time with a new CTE setting. After multiple CTE settings for the given sweep have been implemented and the corresponding FOM values have been determined, then at step 910 the logic circuitry derives a relationship between FOM and the CTE settings. Example relationships are illustrated in FIGS. 6-8 and described above.

The logic circuitry then identifies (step 912) the CTE_setting S_op relative to the FOM threshold (FOM_th) in any of multiple possible examples such as those described above, and at step 914, the logic circuitry (e.g., the centering logic 320) sets the new CTE_setting for the CTE 302 to the value S_op. At step 916, the retimer continues receiving and conditioning input signals A_in with the CTE 302 and DTE 303 having been adapted as described herein.

FIGS. 10, 11 and 12 illustrate an implementation of step 408 in FIG. 4 in which the tap weights for the FFE 304 and DFE 310 are adapted. According to certain embodiments, a gradient descent adaptation process is used in process 404 to adapt the tap weights for the FFE and DFE. FIG. 10 illustrates an example implementation of a DTE update logic 1040, which may be used for the implementation of the DTE update logic 340 of FIG. 3. As shown in FIG. 10, gradient computation logic 1000 is logic circuitry that receives the output of summing logic 307 and computes an error gradient, $\psi^m$, for the current output of summing logic 307 for the $m^{th}$ iteration (e.g., $m^{th}$ output sample) relative to a previous iteration (e.g., iteration m−1), in the manner of, for example, least mean squares (LMS) minimization. Error gradient $\psi^m$ is a vector of components corresponding to the tap weight values being adjusted. Error gradient $\psi^m$ is applied to dynamic adaptation bandwidth controller 1002, which may be implemented as a logic circuit that calculates a convergence coefficient $\mu^m$ for the current $m^{th}$ iteration of DTE adaptation. Convergence coefficient $\mu$ represents a "bandwidth of adaptation," in that a relatively large convergence coefficient $\mu$ causes a large incremental change in the tap weights of DTE 303 (e.g., for FFE 304 and DFE 310), while a relatively small convergence coefficient $\mu$ results in a smaller incremental change in those tap weights. The current error gradient $\psi^m$ from gradient computation logic 1000 and the calculated convergence coefficient $\mu^m$ from dynamic adaptation bandwidth controller 1002 are applied to inputs of multiplier 1004, which produces a product ($\mu^m * \psi^m$) that is applied to an input of summing logic 1006. Summing logic 1006 derives a vector $h^m$ of tap weights for DTE 303 for the current $m^{th}$ adaptation iteration as a sum of the current value of product ($\mu^m * \psi^m$) and the tap weight vector $h^{m-1}$ from the previous iteration (m−1):

$$h^m = \mu^m(\Psi m) + h^{m-1} \quad (2)$$

FIG. 11 illustrates an example of the operation of DTE update logic 340 in adapting DTE 303. This operation may be performed either during an initial link establishment or, because channel conditions may change over time, post-initialization to re-adapt DTE 303. In the former case, initial link establishment, the DTE 303 is initialized to set tap weights of FFE 303 and DFE 310 and the gain of VGA 306 to some initial condition. In the latter case (re-adaptation of the DTE 303), FFE 303 and DFE 310 will already have their tap weights set to some previously adapted values. In either case, an input signal is conditioned by CTE 302 and DTE 303 with CTE 302 at its current CTE_setting value at step 1104. In step 1106, gradient computation logic 1000 of DTE update logic 1040 computes a current error value based on the results of the signal conditioning of step 1104. From that current error value and a previous error value, the DTE update logic 1040 computes a current error gradient vector $\psi^m$ in step 1106.

In step 1108, the dynamic adaptation bandwidth controller 1002 calculates a current value of convergence coefficient $\mu^m$. According to certain embodiments, dynamic adaptation bandwidth controller 1002 uses the history of the error gradient $\psi^m$ computed by gradient computation logic 1000 in at least one previous iteration to determine the value of the convergence coefficient $\mu^m$ for the current iteration in step 1108.

FIG. 12 illustrates an example of an implementation of a dynamic adaptation bandwidth controller 1200, as may be used to implement dynamic adaptation bandwidth controller 1002 (FIG. 10) for performing the determination of convergence coefficient $\mu$ in step 1108 according to embodiments. Dynamic adaptation bandwidth controller 1200 receives the error gradient $\psi^m$ for the $m^{th}$ iteration from gradient computation logic 1000 and applies the error gradient $\psi^m$ to delay stage 1202 and to an input of dot product logic 1204. Another input of dot product logic 1204 receives the delayed error gradient $\psi^{m-1}$ from the previous iteration from delay stage 1202. Dot product logic 1204 represents computational logic circuitry for performing the dot product (e.g., inner product) of the error gradient vectors $\psi^m$ and $\psi^{m-1}$, for example, as a sum of the products of the corresponding vector components. The output of dot product logic 1204, as may be filtered by hysteresis filter 1206, is applied to bandwidth adjustment logic 1208, which in turn generates convergence coefficient $\mu^m$ for the current $m^{th}$ iteration from the filtered dot product output. While the dot product of two vectors has both a magnitude and a sign, the dot product magnitude in the context of adaptive equalization may be more indicative of signal strength than of convergence of the adaptive equalizer. According to these embodiments, the sign of the dot product of error gradient vectors $\psi^m$ and $\psi^{m-1}$ provides an indication of the extent to which the adaptation of receive path 300 has converged, and is used in the adjustment of the convergence coefficient $\mu$ according to these embodiments.

The determination of convergence coefficient $\mu^m$ by bandwidth adjustment logic 1208 may be performed in various ways. In one embodiment, bandwidth adjustment logic 1208 uses the sign of the dot product of error gradient vectors $\psi^m$ and $\psi^{m-1}$ computed by dot product logic 804. A negative dot product result indicates that the current error gradient $\psi^m$ has changed direction from the previous iteration's error gradient, $\psi^{m-1}$, from which it can be inferred that adaptation of receive path 300 is nearing convergence; on the other hand, a positive dot product result indicates that the current error gradient $\psi^m$ is in the same direction as the previous iteration error gradient $\psi^{m-1}$, indicating that adaptation is not yet near a convergence point. In this embodiment, bandwidth adjustment logic 1208 decreases convergence coefficient $\mu^m$ by an increment to decrease the bandwidth of adaptation in response to a negative dot product result. Conversely, bandwidth adjustment logic 1208 incrementally increases convergence coefficient $\mu^m$ to increase the bandwidth of adaptation and accelerate convergence in response to a positive dot product result.

According to another embodiment, the time and power required to dynamically adapt the bandwidth of adaptation by controller 1200 can be reduced by implementing dot product logic 1204 and bandwidth adjustment logic 1208 to consider only the largest amplitude component (e.g., the FFE and DFE tap weight with the largest error) of the error gradient vectors $\psi^m$ and $\psi^{m-1}$ rather than compute the full dot product. In this embodiment, dot product logic 1204 identifies the largest amplitude component of the error gradient vectors $\psi^m$ and $\psi^{m-1}$, and bandwidth adjustment logic 1208 determines whether the sign of that error gradient vector component in the current iteration m has changed from its sign in the previous iteration m−1. If so, adaptation of receive path 300 is nearing convergence, and bandwidth adjustment logic 1208 incrementally decreases convergence coefficient $\mu^m$. Conversely, if the sign of the largest error gradient vector component is the same in the current $m^{th}$ iteration as in the previous iteration, adaptation is not near convergence, and bandwidth adjustment logic 1208 to increase the change in the filter tap weights to accelerate convergence.

As noted above, hysteresis filter 1206 can be included in the embodiment of dynamic adaptation bandwidth controller 1200 shown in FIG. 12 to provide stability to the adaptation. Hysteresis filter 1206 may apply a low-pass filter characteristic to the dot product (sign) result from dot product logic 1204 to reduce the frequency of changes in the bandwidth applied by bandwidth adjustment logic 1208. According to another approach, hysteresis filter 1206 may require either a negative or positive dot product result to exceed a certain magnitude before causing bandwidth adjustment logic 1208 to make any adjustment in the convergence coefficient $\mu^m$. In one embodiment, the hysteresis filter 1206 may be implemented as a digital filter (e.g., implemented using a processor, ASIC, field-programmable gate array, or the like).

Referring to FIG. 11, following the determination of convergence coefficient $\mu^m$ in step 1108, DTE update logic 1040 updates the tap weights of the discrete time filters of FFE 303 and DFE 310, and also possibly the gain of VGA 306, based on the error gradient and a convergence coefficient. As described above for the embodiment shown in FIG. 10, error gradient vector $\psi^m$ from gradient computation logic 1000 and convergence coefficient $\mu^m$ from dynamic adaptation bandwidth controller 1002 are applied to inputs of multiplier 1004 to generate the product ($\mu^m*\psi^m$) for summing with the tap weight vector $h^{n-1}$ from the previous iteration (n−1) at summing logic 1006, to produce the updated tap weight vector $h^n$ as discussed above.

Following that update of tap weights, DTE update logic 1040 determines whether a convergence criterion has been met in decision 1111. The particular convergence criterion (or criteria) applied in decision 1111 may be, for example, the minimization of the mean error or mean squared error to within a preselected threshold limit, or whether a predetermined number of iterations of DTE adaptation has been performed. If the convergence criterion is not met (decision 1111 returns "no"), another iteration of DTE adaptation is performed beginning again with process 1104. Once convergence is attained (decision 111 returns "yes), DTE 303 is adapted for the current value of CTE_setting.

In some embodiments, the retimer described herein may be used in a wireless cellular system (e.g., a 5G wireless cellular system), in which endpoints 100, 101 correspond to network nodes such as a wireless base station, switch fabric, or other network function. The retimer described herein also may be used in other types of communications networks such as Ethernet networks (e.g., Ethernet networks that support 200G/400G data rates), in which case endpoints 100, 101 may correspond to clients, servers, or other network nodes. Such clients, servers, etc. may be realized by computers, computer-controlled sensors, controllers, or other devices linked by way of routers, switches, or other network infrastructure elements.

According to the embodiments described above, one or more technical effects can be achieved. The adaptation of a continuous time equalizer based on the adaption of a discrete time equalizer permits the equalizers to be adapted across channel conditions within a retimer while reducing the retimer's bit error rate and avoiding causing temporary spikes in the retimer's bit error rate.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. Receiver circuitry comprising:
a continuous time equalizer (CTE) having a control input, an output, and a first filter characteristic that is adjustable responsive to a CTE setting at the control input;
a discrete time equalizer (DTE) having an input coupled to the output of the CTE, having a control input, and having a second filter characteristic that is adjustable responsive to a DTE setting at the control input of the DTE; and
logic circuitry coupled to the control input of the CTE, the logic circuitry configured to:
determine a change in the second filter characteristic of the DTE;
compare the change in the second filter characteristic of the DTE to a threshold; and
change the CTE setting to adjust the first filter characteristic responsive to the second filter characteristic of the DTE being outside the threshold.

2. The receiver circuitry of claim 1, wherein:
the DTE includes a discrete time filter having tap weights that are adjustable responsive to the DTE setting at the control input of the DTE; and
the logic circuitry is configured to determine the change in the second filter characteristic of the DTE as a function of a Fourier transform of the tap weights.

3. The receiver circuitry of claim 1, wherein the DFE includes a feed-forward equalizer (FFE).

4. The receiver circuitry_of claim 3, wherein the DTE includes a decision-feedback equalizer (DFE) coupled to the FFE.

5. The receiver circuitry of claim 1, wherein the second filter characteristic of the DTE is a gain.

6. The receiver circuitry of claim 5, wherein the gain is determined at a Nyquist frequency of the receiver circuitry.

7. The receiver circuitry of claim 1, wherein the first filter characteristic of the CTE is a first gain, and the second filter characteristic of the DTE is a second gain, and the logic circuitry is configured to:
determine that the second gain of the DTE has increased by more than the threshold; and
change the CTE settings to increase the first gain of the CTE.

8. The receiver circuitry of claim 1, wherein the first filter characteristic of the CTE is a first gain, and the second filter characteristic of the DTE is a second gain, and the logic circuitry is configured to:
determine that the second gain of the DTE has decreased by more than the threshold; and
change the CTE settings to decrease the first gain of the CTE.

9. The receiver circuitry of claim 1, wherein the second filter characteristic of the DTE is a gain, and the logic circuit being configured to compare the change in the second filter characteristic of the DTE to a threshold incudes the logic circuitry is-being configured to:
determine a ratio of a current gain of the DTE to a previous gain of the DTE; and,
determine whether the ratio has increased by more than a first threshold or has decreased by more than a second threshold.

10. The receiver circuitry of claim 1, wherein the CTE is an continuous time linear equalizer (CTLE).

11. The receiver circuitry of claim 1, wherein the logic circuitry includes a microcontroller.

12. The receiver circuitry of claim 1, wherein the receiver circuitry_is included in a retimer.

13. Apparatus comprising:
a continuous time equalizer (CTE) having control input, an output, and a filter characteristic that is adjustable responsive to a CTE setting at the control input;

a discrete time equalizer (DTE) having an input coupled to the output of the CTE, having a control input, and having a gain that is adjustable responsive to a DTE setting at the control input of the DTE; and logic circuitry coupled to the control input of the CTE, the logic circuitry configured to:

determine a change in the gain of the DTE;

compare the change in the gain of the DTE to first and second thresholds;

change the CTE setting to increase the filter characteristic of the CTE responsive to the change in the gain of the DTE exceeding the first threshold; and change the CTE setting to decrease the filter characteristic of the CTE responsive to the change in the gain of the DTE being less than the second threshold.

14. The apparatus of claim 13, wherein the DTE includes a feed-forward equalizer (FFE) having an input coupled to the output of the CTE.

15. The apparatus of claim 13, wherein the gain is determined at a Nyquist frequency of the apparatus.

16. The apparatus of claim 13, wherein the CTE includes continuous time linear equalizer (CTLE).

17. The apparatus of claim 13, wherein the logic circuitry is configured to compare the change in the gain of the DTE to the first and second thresholds by determining a ratio of a current gain to a previous gain and comparing the ratio to the first and second thresholds.

18. A method for adapting a continuous time equalizer (CTE), the method comprising:

determining a change in gain of a discrete time equalizer (DTE);

determining whether the gain of the DTE has increased or decreased by more than a threshold amount;

responsive to determining that the gain has increased or decreased by more than the threshold amount, provide an adjusted CTE setting to the control input of the CTE to increase or decrease a filter characteristic of the CTE in a same direction with the change in gain of the DTE.

19. The method of claim 18, wherein the gain of the DTE is a function of a Fourier transform of a frequency response of the DTE.

20. The method of claim 18, wherein determining whether the gain of the DTE has increased or decreased by more than the threshold amount includes:

determining a ratio of a current value of the gain to a previous value of the gain; and determining whether the ratio has increased or decreased by more than the threshold amount.

* * * * *